United States Patent [19]

Blanchette et al.

[11] Patent Number: 5,545,544
[45] Date of Patent: Aug. 13, 1996

[54] **PROCESS FOR TREATMENT OF WASTE STREAM USING *SCYTINOSTROMA GALACTINUM* FUNGUS ATCC 20966**

[75] Inventors: Robert A. Blanchette, Shoreview, Minn.; Theresa S. Brush, Lexington, Mass.; Roberta L. Farrell, Danvers, Mass.; Keith A. Krisa, Somerville, Mass.; Chittra Mishra, Lexington, Mass.

[73] Assignees: Sandoz Ltd., Basel, Switzerland; The Regents of the Univ. of Minnesota, Minneapolis, Minn.

[21] Appl. No.: 471,126

[22] Filed: Jun. 6, 1995

Related U.S. Application Data

[62] Division of Ser. No. 330,874, Oct. 28, 1994, which is a continuation of Ser. No. 198,459, Feb. 18, 1994, Pat. No. 5,427,945, which is a continuation of Ser. No. 276,081, Nov. 23, 1988, abandoned.

[51] Int. Cl.$^6$ .............................. C12N 1/14; C12P 1/02; D12C 1/00; D12C 3/00
[52] U.S. Cl. .................. 435/171; 435/254.1; 435/277; 435/278; 435/911; 210/601; 210/928
[58] Field of Search ..................... 435/254.1, 911, 435/171, 192, 209, 277, 278; 210/601, 928

[56] References Cited

U.S. PATENT DOCUMENTS

| | | | |
|---|---|---|---|
| 4,444,621 | 4/1984 | Lindahl | 162/26 |
| 4,514,424 | 4/1985 | Raccach | 426/56 |
| 4,554,075 | 11/1985 | Chang et al. | 210/611 |
| 4,687,741 | 8/1987 | Farrell et al. | 435/189 |
| 4,687,745 | 8/1987 | Farrell | 435/278 |

OTHER PUBLICATIONS

"Biology Of Lignin Degradation", Leisola, M., et al., Biotechnology and Food Industry Proc. Int. Symp. Budapest (1988), pp. 373–382.
"Assessment of 30 White Rot Basidomycetes for Selective Lignin Degradation", Otjen, L., et al., Holzforschung, vol. 41, (1987), No. 6, pp. 343–349.
"Selection of White–rot Fungi for Biopulping", Blanchette, R. et al., Biomass 15 (1988), pp. 93–101.
"Delignification of an unbleached hardwood kraft pulp by *Phanerochaete chrysoporium*", Tran., A., et al., Applied Microbiology and Biotechnology (1987), 25:484–490.
"Dechlorination of chloro–organics by a white–rot fungus", Huynh, V., et al., Tappi Journal, Jul. 1985, pp. 98–102.
Staikova et al., "Effect of Inducers . . ." 107:55422x abstract, vol. 107 (1987).
Tran et al., "Delignin . . .", 1987, 25:484–90.
Nakasone et al., "Scytinostioma . . .", 80(4) 1988.

*Primary Examiner*—David M. Naff
*Assistant Examiner*—Deborah K. Ware
*Attorney, Agent, or Firm*—Robert S. Honor; Carl W. Battle; Michael P. Morris

[57] ABSTRACT

The white rot fungus *Scytinostroma galactinum* strain F361 and mutants thereof are particularly effective in selectively grading the lignin component of lignin-containing materials, particularly processed wood pulps including chemical pulps, and also particularly effective in degrading lignin degradation products such as chlorinated degraded lignin by-products as found, for example, in E-1 effluents, and also in degrading chlorine-containing aromatic compounds generally as found in aqueous waste streams containing the same.

8 Claims, No Drawings

PROCESS FOR TREATMENT OF WASTE STREAM USING *SCYTINOSTROMA GALACTINUM* FUNGUS ATCC 20966

This is a divisional of application Ser. No. 08/330,874, filed Oct. 28, 1994, now allowed, which is a continuation of application Ser. No. 08/198,459, filed Feb. 18, 1994, now U.S. Pat. No. 5,427,945, which in turn is a continuation of application Ser. No. 07/276,081, filed Nov. 23, 1988, now abandoned.

This invention relates to fungi of the white rot type and the use thereof, particularly in the modification and degradation of lignin and modified lignins.

Various bacteria and fungi are known to survive on and degrade wood. For example, white-rot basidiomyctes (fungi) are known to form and survive on wood, and their nourishment as obtained from the wood is manifested in the observed slow decay of the wood. Such fungi typically obtain their nourishment from the ultimate degradation products of cellulose but release a host of enzymes which degrade substantially all organic wood components including not only the cellulose but also hemicellulose and lignin.

White-rot basidiomycetes remove lignin from wood in several morphologically distinct patterns. One type of decay known as "selective delignification" is apparent when greater amounts of lignin are degraded relative to the amount of cellulose. In this type of decay, lignin in the secondary wall and middle lamella may be almost entirely removed, whereas large quantities of cellulose in the S2 layer of the cell wall are left intact. White rot basidiomycetes can also cause a "simultaneous rot". This type of decay is characterized by the removal of both cellulose and lignin, leaving cells either riddled with bore holes and erosion troughs, or with extensively thinned secondary walls. Much variation exists among these decay types. Some Basidiomycetes cause only a simultaneous rot whereas others may produce a simultaneous rot in one part of the substrate and predominantly a delignification in another. In such cases, a chemical analysis of the entire substrate can misrepresent the potential of these fungi to cause selective lignin removal. Some other white rot fungi have been shown to be initially very selective for lignin and then later attack the remaining cellulose. Thus, the selectivity of some fungi for lignin can change depending on the stage of decay at which chemical analyses are done.

To avoid difficulties arising from the interpretation of lignin and wood sugar analyses, several methods are used to evaluate the capacity of fungi to selectively degrade lignin. A screening technique involving scanning electron microscopy has been used to differentiate the type of decay produced by different white rot fungi. This technique, coupled with traditional chemical analyses, provides the more accurate means of screening available.

One such type of white rot fungi, *Phanerochaete chrysosporium* and mutants thereof (see, for example, U.S. Pat. No. 4,687,741) can be viewed with simplicity as releasing a battery of largely cellulose degrading enzymes (cellulases) in order to obtain its nourishment from wood. Since the cellulose is isolated within barrier layers or regions made up of hemicellulose and lignin, the supply of cellulose directly available to the fungus is limited and becomes exhausted. At this point the fungus has less and less cellulose available for survival and enters essentially a starvation phase in which the fungus then releases hemicellulose and lignin degrading enzymes (hemicellulases and ligninases, respectively) which remove the barrier layers and expose the next layered supply of cellulose for nourishment. This cycle will be repeated on and on in the process of the total natural decay of wood. Essentially on the theory that the fungus could be induced to produce enzymes affecting lignin in deference to those affecting cellulose, *Phanerochaete chrysosporium* cultures were found to degrade lignins in pulps, including chemically modified pulps (known as chemical pulps), in a selective manner. The fungus was also found to degrade chemically altered lignin degradation products as produced, for example, in the primary bleaching stage of the kraft process (so-called "E-1 effluents"). *P. chrysosporium* is more effective on hardwood lignins than on softwoods.

One primary chemical method for making pulp from wood involves the digestion of lignin in the wood with sodium sulfide and sodium hydroxide. This is termed the sulfate or kraft process, and the resulting pulp is termed "chemical pulp". The known "sulfite" process also produces a chemical pulp.

Wood pulp produced, for example, in the kraft process, generally contains about 4–12% by weight of residual lignin, at least some of which is chemically modified to give the pulp a characteristic brown color. To obtain a pulp of high brightness and brightness stability, the lignin and/or modified lignin must be further treated and removed by certain agents in one or more treatments or stages commonly referred to as bleaching. And, in general, all chemical pulps are subjected to one or more bleaching treatments for similar purposes. Many bleaching processes exist but almost all kraft pulp bleachings begin with the chlorination-extraction (C-E) stage. Other bleachings use hypochlorite, chlorine dioxide, oxygen or other oxidizing chemicals such that the degraded lignin component freed from the pulp is chlorinated and/or oxidized, and hence further chemically modified. There is some loss and damage of cellulosic fibers during the C-E stage but the cellulosic content remains high and sufficiently intact that paper/board products of acceptable quality can be produced, hence the process is selective. The C-E effluents (included among those called E-1 effluents) resulting from treated pulp contain a very large number of organic compounds having a bound chlorine content of 2.5–3.5 kg/ton pulp. Some of these compounds, primarily the chlorinated phenolics, have been identified as having toxic, mutagenic and carcinogenic effects (Alberti, B. N. and Klibanov, A. M. [1981] Biotechnology and Bioengineering Symp. 11: 373–379). Alternatives to chlorine bleaching have, therefore, long been sought by industry. As use herein, the term E-1 effluent refers to the effluent-resulting from extraction of chemical pulp after the first or primary bleaching stage.

The use of fungi and their enzyme systems in the processing of wood pulps and chips (biopulping generally) to improve efficiency and reduce environmental problems in the pulp and paper industry has been the subject of increasing interest and investigation.

The major object of the present invention is to provide a fungus with particularly suitable properties and capabilities for degrading lignin in a manner which is selective in lignin relative to affecting the cellulose content of the substrate. Another major objective is to provide a fungal system capable of degrading chemically modified lignins such as those presented in chemical pulps, and particularly those presented in the kraft pulping process immediately prior to or at a time after bleaching. A further object is to provide a fungus for degrading chemically modified lignin degradation products such as those in effluents (eg. the so-called E-1 effluent) from the pulp bleaching processes.

These and other objects will be apparent from the following description.

In accordance with the present invention it has been found that a strain of *Scytinostroma galactinum,* identified as strain F361, is particularly effective in selectively degrading lignin and chemically modified lignins, and also in degrading lignin degradation products, including chemically modified lignin degradation products. Such ability of F361 is remarkable since this fungus appears to produce only small relative amounts of the type of ligninase enzymes which made systems based on *Phanerochaete chrysosporium* of interest for similar uses. The fungus F361 has also been observed to be relatively slow growing in liquid culture but is surprisingly effective in selectively degrading lignin in wood. It is particularly desirable in that it selectively and significantly degrades lignin in both softwoods and hardwoods. The Fungus F361 is also capable of growing for extended periods and its long life is of particular advantage, especially in the degradation of chemically modified lignin degradation products found in waste streams such as the E1 effluent from the kraft process.

The *Scytinostroma galactinum* strain F361 was deposited under the Budapest Treaty as a biologically pure culture on Nov. 21, 1989 with the ATCC and received the accession No. ATCC 20966. Since this strain may naturally undergo mutation or mutation may be artificially induced without changing the desirable or advantageous characteristics of F361, the invention is also deemed to apply routants of F361 which retain the basic properties and capabilities of the F361 strain.

The term "lignin component" as used herein is designed to refer to not only natural lignins which have not been chemically modified but also the form in treated or processed pulps wherein the lignin is chemically modified by various chemical treatments such as in the pre-bleaching stage of the Kraft process.

The term "degrading" as used herein with reference to the lignin component in a substrate is meant to encompass not only fungal enzyme action which modifies or degrades the lignin component in a manner causing it to dislodge either immediately or upon washing or extraction of the substrate but also fungal enzyme action which modifies or degrades the hemicellulose which binds or holds the lignin component, which action results in or enables the freeing of the lignin component either immediately or upon washing or extraction of the treated substrate, eg. pulp. Hence, the degradation of lignin as encompassed by the invention is an action essentially effective to release the lignin component from the substrate. In the case of many pulps, the desired action is evidenced by a brightening of the pulp.

The F361 fungal strain and mutants thereof may be grown in a known manner using, for example, stationary flasks or a Rotating Biological Contactor (RBC). Since the fungus is slow growing, an extended time period is generally allowed. Growth of the F361 fungus is described in detail in Example 1, hereinafter. The fungus as a biologically pure culture is generally grown in the presence of conventional fungal growth media including a carbon source such as glucose. To degrade a lignin component and its by-products, the fungus is desirably cultured in the presence of an inducer in order to encourage or enhance production by the fungus of its lignolytic enzymes which effect the desired degradation of the lignin component or lignin degradation products which the fungus degrades. Suitable inducers are lignin, lignin-containing substances and substances having an origin in lignin including its degradation products, both natural and those arising from chemical degradations. Examples of such inducers include isolated and purified lignin, cellulosic substrates containing a bound lignin component and aromatic ring-containing lignin component degradation products which are unbound to a cellulosic substrate. Suitable inducers therefore include unprocessed wood, in various forms such as block, chips or dust, processed wood such as pulps in which the lignin is untreated chemically, various modified pulps including kraft or other chemically treated pulps, lignin itself, E1 effluent or other waste streams containing chemically modified lignin degradation products and so-called aromatic lignin model compounds which represent natural degradation products of lignin which are further modified or degraded by the fungus, such as 2,6-dimethoxyphenol or other hydrocarbon aromatic ring substituted by a hydroxy group, particularly a phenol, or veratryl alcohol. The chemical compounds which the fungus also modifies or degrades but which do not have an origin in lignin may also be used as inducers although it is generally preferred to induce the desired growth phases with substances having an origin in lignin. It will be appreciated that different inducers may induce at any given growth time varying proportions of the lignin degrading enzymes produced naturally by the fungus. In general, inducers are used in cultural growth in the presence of suitable growth media at approximately a 1% level weight by volume. On the other hand, the inducer may be present in high proportions to effect a desired action on the inducer by way of a chemical modification or degradation. An inducer for hemicellulases may also be added, particularly an inducer for mannanases when softwood is being treated. Substances having an origin only in cellulose, such as glucose, while useful in growing the fungus, are indicated to have a significant inhibitory effect on production by the fungus of desired enzymes and therefore are desirably used in reduced amounts or eliminated entirely when culturing the fungus for practical applications such as in the bleaching of pulp.

In general, substances which induce the production of lignin degrading enzymes by the fungus are also substances which may be desirably modified or degraded by the fungus.

The F361 strain of *S. galactinum* may be used in accord with the invention in any of a variety of ways to modify or degrade lignin and lignin degradation products, including both natural lignins and their degradation products and modified lignins; particularly chemically modified lignins, and their degradation products. A suitable type substrate is a cellulosic substrate containing a bound lignin component. Typically, as is the case with wood, the binding is associated with hemicellulose which is also contained by such substrates. The fungus is particularly useful in a variety of applications on wood pulp. Various mechanical pulps are of interest (see Casey, J. P. (1983) Tappi Journal 66: 95–96). Hence, the fungus may be used to treat thermomechanical pulps (TMP) to reduce its lignin component to enhance brightness stability and enhance strength properties. Other mechanical pulps such as chemithermomechanical pulp (CTMP) and chemimechanical pulp (CMP) may be also treated with the fungus to improve brightness stability and strength properties. Of particular interest for treatment by the fungus are chemical pulps such as sulfite pulps and kraft pulps which may be bleached by the fungus to reduce the lignin component content, particularly in the stage of the kraft process in which chlorine bleaching has been used.

Another use of particular interest involves the treatment of aqueous effluents or waste streams comprising a degraded lignin component in order to further degrade the lignin component. More particularly of interest for such treatment are the effluents discharged from pulping processes and containing chemically modified, degraded lignin components, especially those from the kraft process such as the E1 effluent containing aromatic substrates resulting from the chlorine bleach stage. The treatment of such effluents by the fungus degrades the chloro-aromatic lignin degradation products and effects a lightening or decolorizing of these normally brown or discolored liquids.

In general, cellulose/hemicellulose/lignin substrates may be treated with F361 or mutant thereof to selectively reduce the lignin content by inoculating the substrate or media containing the substrate with the fungus such that the fungus grows in contact with the substrate. Temperatures may range from 15° C. to 40° C., and are preferably in the range of 20° C. to 34° C. Oxygen or an oxygen-containing gas such as air is generally provided to support fungal growth. In the treatment of pulp substrates such as kraft pulps with the fungus to effect a substantial removal of the lignin component and a bleaching thereof, it has been independently found particularly effective to employ the fungus in systems in which the pulp consistency is in the medium to high range, hence a pulp consistency of at least 7%, more preferably at least 9% and desirably at least 12%. Pulp consistencies may range as high as 30% or even somewhat higher but are more suitably in the range of 10% to 20%. Consistency is determined by the standard procedure involving the dry weight of pulp (after drying for 2.5 hours at 60° C. ) as a percentage of the total system measured in volume. The use of Basidiomycetes fungi in the treatment of wood pulps at pulp consistencies of at least 7% is the subject of cofiled application Ser. No. 276,090.

The time of treatment sufficient to modify or degrade the lignin may vary in the substrate widely from a few hours to several days depending upon a number of factors such as the extent of treatment desired, the substrate being treated and the conditions and efficiency of the system employed. The pH of such systems is suitably not greater than 7, and usually in the range from 3 to 6, preferably 4 to 5.

For the treatment of substrates normally encountered in diluted media, such as degraded lignin-component containing waste streams or effluents, eg. E1 effluent, these are usually treated by contacting the effluent solution or suspension with the fungus as grown on slants, plates, discs and the like, such as demonstrated herein or as described in U.S. Pat. No. 4,554,075. Temperatures are generally in the range of from 15° C. to 40° C., preferably 20° C. to 34° C. The reaction system is continuously or periodically supplied with oxygen in a manner such that the oxygen is available to the fungus. Pure oxygen or an oxygen containing gas such as air may be used. Preferably, the contact of the waste stream with any given portion of the fungal culture is intermittent such that the culture is exposed alternately to the effluent and oxygen. Analysis of the degraded E-1 effluent from the chlorine bleaching of kraft pulp indicates an ability of the fungus to essentially remove chlorine from the aromatic components thereof, as revealed by an increase in inorganic chlorides and reduction in organic chlorides. It is therefore further indicated that the F361 fungus may also be used to degrade other unwanted chlorine-containing, aromatic compounds (eg. ring substituted by chlorine) generally as may be found in aqueous waste streams containing the same. Such a treatment, which may be carried in the same manner as E-1 effluents are treated, are also within the scope of the invention.

The following examples are merely illustrative of the invention and factors bearing on its practice.

EXAMPLE 1

Growth of *Scytinostroma galactinum* a) Preparation of mycelial suspension

The F361 mycelia are grown on Yeast Nitrogen Phosphate Dextrose (YNPD) agar with the following nutrients:

| | |
|---|---|
| glucose | 10 gms |
| malt extract | 10 gms |
| peptone | 2 gms |
| yeast extract | 2 gms |
| asparagine | 1 gm |
| $KH_2PO_4$ | 2 gms |
| $MnSO_4 \cdot 7H_2O$ | 1 gm |
| thiamin.HCl | 1 mg | in a final volume of one liter; the pH adjusted to pH 4.2. The mycelial fragments are inoculated onto slants containing 50 ml YNPD agar which are loosely capped and remain at room temperature. Growth occurs in 3 to 4 weeks. A mycelial suspension is prepared by diluting the cultures with 100 ml of sterilized deionized water, mixing well and filtering through sterilized cheesecloth.

b) RBC Growth in Presence of Veratryl Alcohol

Two liters of the fungal growth media in the RBC is inoculated with the mycelial suspension from the slant tube, and left to grow at room temperature, 21° to 25° C. The RBCs are rotated at one revolution per minute. Establishment of fungal cultures onto the discs takes one month. The fungal cultures are aerated 3 to 4 times per week with oxygen, by flooding the airspace over the culture with pure oxygen. Media is replenished as it evaporates, with 1 to 2 changes of media during the first 2 months.

The growth media consists of the following nutrients, buffers and elements:

2 ml of 0.4M veratryl alcohol 200 ml of 10×B-3

200 ml of 10% glucose 200 ml of 0.1M trans-aconitic acid (recrystallized)

120 ml of 100× trace elements 200 ml of the roycelia suspension 100 ml of $H_2O$ The 10×B-3 is composed of:

| | |
|---|---|
| $NH_4$ tartrate | 2 gms |
| $KH_2PO_4$ | 20 gms |
| $MgSO_4 \cdot 7H_2O$ | 5 gms |
| $CaCl_2$ | 1 gm |
| thiamin.HCl | 10 mgs |
| 100 × trace elements | 70 mLs | and deionized $H_2O$ to equal 1000 mLs total volume. The 100×trace element solution contains the following:

| | |
|---|---|
| nitriloacetate | 1.5 gms |
| $MgSO_4 \cdot 7H_2O$ | 30 gms |
| $MnSO_4$ | 0.5 gms |
| NaCl | 10 gms |
| $FeSO_4 \cdot 7H_2O$ | 0.1 qm |
| $CoSO_4$ | 0.1 gm |
| $CaCl_2 \cdot 2H_2O$ | 0.1 gm |
| $ZnSO_4$ | 0.1 gm |
| $CuSO_4 \cdot 5H_2O$ | 0.01 gm |
| $AlKSO_4$ | 0.01 gm |
| $NaMoO_4$ | 0.01 gm |
| Boric acid | 0.01 gm | in one liter total volume of deionized water. Boric acid is dissolved in 200 ml of deionized water, the pH adjusted to 6.5 with KOH, and the volume is brought to 600 ml. Each mineral is added in the above order and dissolved before the next addition.

EXAMPLE 1-A

Stationary flasks of F361 are grown under the same conditions as Example 1 with approximately 50 ml of growth media in a 250 ml flask or 250 ml of media in a 2 liter flask.

It was also observed that cultures grown at room temperature in a stationary flask on minimal media (containing 192 μM of soluble manganese salt) in the presence of veratryl alcohol produced after about 25 days clearly recognizable quantities of a black material which was identified as manganese oxide. This is the first known instance of a fungal liquid culture producing manganese oxide in the absence of wood. Analysis of enzymes from the supernatant of cultures of F361 has shown relatively high proportions of manganese dependent peroxidases, a heme-containing oxidative enzyme which has been associated with lignin degradation. Similar analysis has also shown the presence of laccase.

EXAMPLE 2

The experiment of Example 1 is repeated except that, after about 10 weeks of growth, 2 liters of growth media containing trace elements and an E-1 hardwood effluent obtained from the S.D. Warren Company Somerset Mill was added to the RBC. The E-1 effluent was diluted with the 2 liters of growth media as described in Example 1, part b), to an absorbance 0.436 (465 nm) which appeared as the color of weak tea. The pH was adjusted to 4.5 and with the E-1 effluent growth media sterilized at 121° C. prior to being added to the RBC. After two days the color was reduced to an absorbance of 0.133 absorbance units (growth media was used to blank the spectrophotometer at 465 nm), a reduction of 70% color, indicating a substantial decolorization of the E1 effluent by the fungus.

EXAMPLE 3

Decolorization of Hardwood E-1 Effluent with Time

To monitor the hourly decrease in color of E-1 effluent the following experiment was carried out. A 1:3 dilution of E-1 effluent (one part effluent to three parts growth media) is adjusted to pH 4.5 with HCl and autoclaved at 121° C. for 30 minutes and cooled to room temperature. Two liters of this 1:3 dilution is added to the same RBC used in Example 2. The absorbance of an aliquot removed hourly for the first 10 hours was read at 465 nm versus the blank which was growth media alone. The results are given in the following table A:

TABLE A

| Hour(s) | A465 nm |
|---|---|
| 0 | 0.717 |
| 1 | 0.595 |
| 2 | 0.535 |
| 3 | 0.485 |
| 4 | 0.464 |
| 5 | 0.445 |

TABLE A-continued

| Hour(s) | A465 nm |
|---|---|
| 6 | 0.421 |
| 7 | 0.399 |
| 8 | 0.381 |
| 9 | 0.375 |
| 14 | 0.320 |
| 30 | 0.255 |
| 73 | 0.175 |

During this time the fungal mat on the RBC disc was becoming mottled in appearance with light and dark areas. Normally, the mat is a creamy white color. Eventually, the mat turned a dark brownish color. To determine if colored products were being absorbed by the mycelia or if a melanin pigment was being produced, sections of the mycelia were analyzed. The dark brown areas were deposits of manganese oxide crystals. Elemental analysis of the crude, undiluted E-1 effluent and effluent diluted with growth media showed that the manganese had come from the growth media and not from the E-1 effluent. Crude E-1 effluent contains only 0.63 ppm manganese whereas the growth media contains 13 ppm.

EXAMPLE 4

Hardwood E-1 Effluent Saturation Study

Hardwood E-1 effluent obtained from the Somerset Mill, Me., USA, was diluted 1:2 (growth media: E-1 effluent) with fungal growth media, the pH adjusted to 4.5 with HCl, and the solution autoclaved at 121° C. for 30 minutes. After cooling, 2 liters of the E-1 effluent-media mixture was added to a RBC containing F361 which had been exposed to hardwood E-1 effluent for 25 days. (After the experiment in Example 3 was completed, the growth media effluent mixture was left in the RBC until removed for this experiment). The RBC rotated at one revolution per minute on the bench top at room temperature. The air-space over the solution was flooded with 100% oxygen for 10 minutes, 3 times a week. The sterilized growth media-effluent solution was changed daily with fresh solution prepared as described above. The decrease in color was monitored at 465 nm after exposure for 24 hours to the fungal mat. Growth media alone is used to blank the spectrophotometer. The results are given in the following Table B:

TABLE B

| day | A465 nm | % Absorbance decrease |
|---|---|---|
| 0 | 1.460 | 0 |
| 1 | .780 | 47 |
| 2 | .828 | 40 |
| 3 | .922 | 37 |
| 4 | .899 | 37 |
| 5 | .948 | 38 |
| 6 | .937 | 35 |
| 7 | .922 | 37 |

EXAMPLE 5

Softwood E-1 Effluent Decolorization

Softwood E-1 effluent obtained directly from the bleach plant at S.D. Warren Co., Somerset Mill, Me., USA, was diluted 3:1 (E-1 effluent to fungal growth media), the pH adjusted to 4.5 with HCl and autoclaved for 30 minutes at 121° C. The RBC used in Example 4, which is now 4 months old, two of those months it has been constantly exposed to hardwood E-1 effluent is used in this experiment. After cooling to room temperature two liters of the softwood E-1 effluent are added to the RBC and the RBC is continued to be aerated with 100% $O_2$ for 10 minutes, three times a week. Decolorization of the E-1 effluent is followed spectrophotometrically as described in Example 3. The results are given in the following Table C:

TABLE C

| time (days) | A465 nm | % Absorbance decrease |
|---|---|---|
| 0 | 2.486 | |
| 1 | 1.266 | 49 |
| 11 | 0.848 | 66 |

EXAMPLE 6

Softwood E-1 Effluent Saturation Study

The saturation study was carried out with the RBC used in Example 5, and the same dilution of softwood E-1 effluent as described there. The E-1 effluent growth media mixture was replaced daily with fresh 1:3 mixture. The absorbance decrease at 465 nm was recorded after 24 hour exposures to the fungal mat. The results are shown in the Table D:

TABLE D

| day | A465 nm | % Absorbance decrease |
|---|---|---|
| 0 | 2.788 | 0 |
| 1 | 1.9957 | 28 |
| 2 | 2.3538 | 16 |
| 3 | 2.3458 | 16 |
| 4 | 2.1223 | 24 |
| 5 | 2.2769 | 18 |
| 6 | 1.9461 | 30 |
| 7 | 2.0083 | 28 |

EXAMPLE 7

Treatment of Undiluted Softwood E-1 Effluent

A comparison between a new growth of F361, 1 month old, and the F361 RBC used in Example 7, now 5 months old (3 months exposed to E-1 effluent) was made to see which growth would decolorize undiluted softwood E-1 effluent at pH 4.5 and pH 10.5. Both growths were exposed to a 3:1 dilution of E-1 effluent to growth media as prepared in Example 5 for 2 days. The 3:1 dilution was removed and replaced with 2 liters undiluted E-1 effluent, pH 4.5 which was previously adjusted to pH 4.5 with HCl, autoclaved for 30 minutes at 121° C., and cooled. Results are given in Table E:

TABLE E

| 3:1 dilution | 1 month old RBC | | 5 month old RBC | |
|---|---|---|---|---|
| (hours) | A465 | % absorb. dec. | A465 | % absorb. dec. |
| 0 | 3.3053 | | 3.3053 | |
| 24 | 3.1704 | 4 | 3.0316 | 8.3 |
| 48 | 3.1503 | 5 | 2.9333 | 11.2 |
| undiluted E-1 effluent | | | | |
| 0 | 3.3086 | | 3.3086 | |
| 24 | 3.3426 | | 3.2876 | 0.6 |
| 48 | 3.3372 | | 3.2631 | 1.4 |

The undiluted, pH 4.5, softwood effluent was replaced in each RBC with two liters E-1 effluent as it comes straight from the paper mill, undiluted, pH not adjusted and not autoclaved. The decrease in color was monitored over the next 8 days. No decrease in absorbance was observed for either RBC, and during the first 24 hours the pH of the E-1 effluent dropped from 10.3 to 9.2 with the new growth of F361 and from 10.3 to 8.6 with the old growth. The fungus started coming off the RBC discs after 8 days.

EXAMPLE 8

Results of Action of F361 Grown with Glucose on kraft pulp a) The action of F361 on the kraft pulp added to the RBC of Example 1 was monitored by periodic visual observation over the course of four weeks time after addition of the pulp with no significant bleaching effect on the pulp.

b) Stationary flasks of F361 are grown under the same conditions as Example 1-A with approximately 150 ml of growth media in a 250 ml flask to which was added 1.5 grams dry weight of Southern softwood kraft pulp or Northern hardwood kraft pulp (pulp consistency about 1.0%). The flasks were autoclaved at 121° C. for 30 minutes and cooled prior to inoculation with 30 ml of a mycelial suspension prepared as in Example 1. The flasked are cultured at room temperature and aerated with pure oxygen 4 times a week. After 30 days time at 25° C., no significant bleaching was observed and Kappa measurements showed no reductions outside of experimental error. The failure to attain a bleaching effect in the experiments of this Example 8 was attributed mainly to an inhibitory effect by glucose on the timely production of desired enzymes.

EXAMPLE 9

Bleaching of kraft pulp with F361

A series of stationary-flask (250 ml) experiments were set up with F361 inoculated directly onto hardwood or softwood kraft pulps obtained from the Scott Paper Company. The pulps were water washed, filter dried and samples divided in two sets. To one set 20 ml of growth media (see Example 1) was added to the pulp before inoculation. To the other set only 20 ml of water was added to the pulp before inoculation. After autoclaving inoculation were effected by adding to the flasks equal size cubes of agar plugs obtained from YNPD agar slants of F361. The hardwood kraft pulp experiments were conducted at a pulp consistency of 23% (dry weight pulp to vol.) and the softwood experiments were conducted at a pulp consistency of 9% (dry weight pulp to vol.). The dry weight of the pulp was determined by the standard procedure of drying for 2.5 hours at 60° C. By day 21 a very heavy bleaching had been observed in all samples and on day 26 (after inoculation) the samples were recovered and treated by a standard alkali extraction (2.5% aqueous sodium hydroxide at 60° C.). Kappa numbers were then determined relative to controls and the results reported below in Table F.

TABLE F

| Treated Kraft Pulp | Kappa | % Kappa Reduction |
|---|---|---|
| Softwood | | |
| Grown in media | 6.2 | 64 |

TABLE F-continued

| Treated Kraft Pulp | Kappa | % Kappa Reduction |
|---|---|---|
| Grown in water | 5.6 | 67.6 |
| Control | 17.3 | — |
| Hardwood | | |
| Grown in media | 6.1 | 52 |
| Grown in water | 5.5 | 56.7 |
| Control | 12.7 | — |

EXAMPLE 9-A

The experiment Example 9 was repeated except that fungal samples grew for 32 days, after which kappa was measured. For this experiment, since the fungal grown samples were visually so well bleached, samples were divided into two parts. To one set the samples were alkali extracted, so as to solubilize lignin, as is normally done by the pulp and paper industry. The other set the samples were washed in hot water but not alkali extracted. The results are given below in Table G.

Table G

| Treated Kraft Pulp | |
|---|---|
| Softwood | Kappa |
| Softwood control & alkali extracted | 17.3 |
| Grown in media & alkali extracted | 4.5 |
| Grown in media & water washed | 9.4 |
| Grown in water & alkali extracted | 5.8 |
| Grown in water & water washed | 6.4 |
| Hardwood | Kappa |
| Hardwood control & alkali extracted | 12.7 |
| Grown in media & alkali extracted | 6.5 |
| Grown in media & water washed | 9.3 |
| Grown in water & alkali extracted | 5.4 |
| Grown in water & water washed | 5.6 |

EXAMPLE 10

Northern softwood (pine) kraft pulp and Northern hardwood kraft pulp, both obtained from the Warren Somerset Mill (Maine, U.S.A.) were each individually evaluated in a series of bleaching experiments using the F361 strain of *Scytinostroma galactinum*. The pulp was cleaned by washing with deionized water and filtered to give a pulp of about 30% consistency. Samples were dried for 2.5 hours at 60° C. to determine the dry weight of the pulp in the moist pulp. Five (5) grams by dry weight of the moist pulp was placed in each of several 8 inch by 10 inch autoclave polypropylene bags and varying amounts of water added to the bags to provide a duplicate series of bagged samples having a different pulp consistency. The bags were sealed and autoclaved at 121° C. for 35 minutes to sterilize the pulp samples, and each then cooled to room temperature. Each bag in a duplicate series was then inoculated with about an equal amount of an agar cube of F361 and the bags agitated to distribute the fungal inoculum in the pulp (the other duplicate series being maintained as a control to which no inoculum was added). A sterilized 5 inch long pasteur pipet fitted with a small sterilized cotton plug was then inserted into each bag and the bag opening sealed around the pipet. Each bag was then aerated through the pipet with pure oxygen and the bags allowed to rest on the work bench top at room temperature. Each day during the experiment each bag was recharged with oxygen. After 19 days, the pulp was recovered from the bags and both the treated samples and untreated control samples were extracted with sodium hydroxide in the conventional manner and the Kappa number of each sample determined, and the results averaged for each pair of samples at each consistency. The results are reported below in Table H.

TABLE H

| | | Kappa No. | |
|---|---|---|---|
| Pulp Consistency (%) | | F361 Treated | Control |
| Softwood | 1 | 19.9 | 21.0 |
| | 3 | 16.8 | 19.7 |
| | 6 | 17.8 | 19.2 |
| | 9 | 13.7 | 18.9 |
| | 12 | 12.9 | 19.3 |
| | 15 | 7.3 | 20.5 |
| | 20 | 12.4 | 19.8 |
| Hardwood | 1 | 12.0 | 13.6 |
| | 3 | 12.5 | 13.1 |
| | 6 | 13.1 | 12.6 |
| | 9 | 10.5 | 12.7 |
| | 12 | 6.7 | 13.0 |
| | 15 | 6.9 | 13.9 |
| | 20 | 7.1 | 14.1 |

EXAMPLE 11

Example 10 was repeated using the same pulps obtained from the same source but at a different time. The results are reported below in Table I.

TABLE I

| | | Kappa No. | |
|---|---|---|---|
| Pulp Consistency (%) | | F361 Treated | Control |
| Softwood | 9 | 4.3 | 15.7 |
| | 12 | 4.9 | 15.7 |
| | 15 | 5.6 | 15.7 |
| | 18 | 3.7 | 15.7 |
| | 21 | 4.6 | 15.7 |
| Hardwood | 3 | 12.4 | 20.8 |
| | 5 | 15.6 | 19.1 |
| | 6 | 12.9 | 18.2 |
| | 7 | 10.2 | 21.4 |
| | 9 | 7.9 | 19.8 |

EXAMPLE 12

Stationary flask experiments in the general manner of Example 8(b) were carried at 4.5% and 16.5% pulp consistencies with xylan and/or mannan as an inducer for xylanase and mannanase enzymes to remove hemicellulose from kraft pulp. A preinoculum for the hardwood pulp was prepared by mixing for 4 days on a shaker table 10 ml of an aqueous suspension of F361 mycelial fragments (obtained from a stationary flask) together with a preinoculum media composed of 0.25% xylan, 1.0% E-1 effluent from hardwood pulp bleaching and 90 ml of a modified 1X concentrate of the F361 growth media prepared as in Example 1 except that the veratyl alcohol was omitted and only 0.4% of glucose was added (total 100 ml in 500 ml flasks). A similar preinoculum was prepared for softwood except that 0.5% mannan was substituted for the xylan and a softwood E-1 effluent was substituted for the hardwood effluent. All pulps were sterilized prior to inoculation.

Hardwood kraft pulp was treated in one series of 500 ml flasks by mixing 5 grams dry weight of pulp, 10 ml of the hardwood preinoculum and 100 ml of 1X of the concentrate modified growth media.

Hardwood kraft pulp was also treated in second series by mixing 5 grams dry weight of pulp, 10 ml of the hardwood preinoculum, 1.0 gram of xylan and 100 ml of the 1X concentrate modified growth media.

Softwood kraft pulp was treated in a third series by mixing 5 grams dry weight of pulp, 10 ml of softwood preinoculum and 100 ml of the 1X concentrate of the modified growth media.

Softwood kraft pulp was also treated in a fourth series by mixing 5 grams dry weight of pulp, 10 ml of softwood preinoculum, 1.0 grams of mannan and 100 ml of the 1X modified growth media.

Softwood kraft pulp was also treated in a fifth series similar to the fourth series except that 0.5 grams each of xylan and mannan was substituted for the 1.0 gram mannan.

A sixth, seventh, eighth, ninth and tenth series were prepared using 20 ml of 2X concentrate modified growth media in place of the 100 ml of 1X growth media (resulting in a pulp consistency of 16.5%).

Controls were run without the addition of xylan, mannan or combination thereof at 4.5% and 16.5% softwood pulp and hardwood pulp.

Treatments were run for 15 and 50 days, after which Kappa Number was evaluated. The results are given below in Table J (15 days) and Table K (50 days).

TABLE J

| | 15 Days - Kappa Results | | | |
|---|---|---|---|---|
| | Hardwood-Consistency | | Softwood Consistency | |
| Series | 4.5% | 16.5% | 4.5% | 16.5% |
| No extra carbon source | 13.3 | 10.3 | 23.5 | 17.9 |
| Plus Mannan | | | 21.5 | 17.4 |
| Plus Xylan | 13.9 | 14.5 | — | — |
| Plus Mannan and Xylan | — | — | 22.1 | 16.4 |
| Control | 15 | 15 | 22 | 22 |

TABLE K

| | 50 Days - Kappa Results | | | |
|---|---|---|---|---|
| | Hardwood-Consistency | | Softwood-Consistency | |
| Series | 4.5% | 16.5% | 4.5% | 16.5% |
| No extra carbon source | 7 | 5.2 | 9.8 | 6.1 |
| Plus Mannan | — | — | 12 | 5.1 |

TABLE K-continued

| | 50 Days - Kappa Results | | | |
|---|---|---|---|---|
| | Hardwood-Consistency | | Softwood-Consistency | |
| Series | 4.5% | 16.5% | 4.5% | 16.5% |
| Plus Xylan | 12 | 10.8 | — | — |
| Plus Mannan and Xylan | — | — | 13.2 | 4.7 |
| Control | 15 | 15 | 22 | 22 |

The kappa number is the volume (in milliliters) of 0.1N potassium permanganate solution consumed by one gram of moisture-free pulp under the conditions specified in this method. The results are corrected to 50% consumption of the permanganate added. In determining Kappa number in the foregoing examples, the following standard method which is incorporated herein by reference was used: TAPPI Test Methods, (Tappi, Atlanta, Ga.) Vol. 1, 1988 "Kappa number of pulp—T 236 cm 85".

What is claimed is:

1. A process of treating an aqueous waste stream containing a modified lignin component comprising contacting the waste stream with a biologically pure culture of *Scytinostroma galactinum* fungus strain ATCC 20966 or mutant thereof possessing all of the identifying characteristics of strain ATCC 20966, for a time sufficient to degrade the modified lignin component in the aqueous waste stream.

2. The process of claim 1 in which the aqueous waste stream is an effluent resulting from extraction of chemical pulp after a primary bleaching stage.

3. The process of claim 2 in which the effluent results from chlorine bleaching of kraft pulp.

4. The process of claim 1 in which a gas comprising oxygen is supplied to enhance growth of the fungus.

5. The process of claim 2 in which a gas comprising oxygen is supplied to enhance growth of the fungus.

6. The process of claim 5 in which the fungus is grown on rotating discs which are partly immersed in the effluent being treated.

7. A process of treating an aqueous waste stream containing a chlorine-containing aromatic compound comprising contacting the waste stream with a biologically pure culture of *Scytinostroma galactinum* fungus strain ATCC 20966, or mutant thereof possessing all of the identifying characteristics of strain ATCC 20966, for a time sufficient to degrade the chlorine-containing aromatic compound.

8. The process of claim 1 in which the fungus is grown in the presence of an inducer for the production of mannanase.

\* \* \* \* \*